United States Patent
Brookner et al.

(10) Patent No.: US 7,225,166 B2
(45) Date of Patent: May 29, 2007

(54) REMOTE AUTHENTICATION OF TWO DIMENSIONAL BARCODED INDICIA

(75) Inventors: George Brookner, Norwalk, CT (US); Roman Kresina, Oxford, CT (US)

(73) Assignee: Neopost Technologies, Bagneux (FR)

( * ) Notice: Subject to any disclaimer, the term of this patent is extended or adjusted under 35 U.S.C. 154(b) by 875 days.

(21) Appl. No.: 10/355,871

(22) Filed: Jan. 31, 2003

(65) Prior Publication Data
US 2003/0182238 A1   Sep. 25, 2003

Related U.S. Application Data

(60) Provisional application No. 60/366,861, filed on Mar. 22, 2002.

(51) Int. Cl.
G06Q 99/00 (2006.01)
H04K 1/00 (2006.01)
H04L 9/00 (2006.01)

(52) U.S. Cl. .............. 705/62; 705/50; 705/51; 705/60; 705/64; 705/401; 705/408

(58) Field of Classification Search .............. 705/50, 705/51, 60, 62, 64, 400, 408
See application file for complete search history.

(56) References Cited

U.S. PATENT DOCUMENTS 6,005,945 A * 12/1999 Whitehouse ............ 380/51
6,039,257 A * 3/2000 Berson et al. ........... 235/468
6,175,827 B1 * 1/2001 Cordery et al. ......... 705/410
2001/0044783 A1   11/2001 Weisberg et al. ........ 705/62

FOREIGN PATENT DOCUMENTS

| EP | 0676877 A2 | 10/1995 |
| EP | 862145 A2 * | 9/1998 |
| EP | 926630 A2 | 3/1999 |
| EP | 1096429 A2 | 5/2001 |
| WO | WO01/86579 A2 | 11/2001 |

OTHER PUBLICATIONS

"Pitney Bowes: Pitney Bowes receives US Postal Service approval to test new PC postage product", M2 Presswire, Nov. 12, 1998.*

* cited by examiner

Primary Examiner—Calvin L. Hewitt, II
(74) Attorney, Agent, or Firm—Kenyon & Kenyon LLP (57) ABSTRACT

An indicia authentication system includes a franking device for embedding identification and encrypted authentication data into indicia and applying the indicia to an article, and a computing device for utilizing the identification data to retrieve a key for deciphering the encrypted authentication data, where the computing device is adapted to utilize the deciphered authentication data to determine the validity of the indicia.

7 Claims, 6 Drawing Sheets

FIG.6 ered or applied to items to be mailed. Computer 105 may also have appropriate software for performing the functions described. -->
REMOTE AUTHENTICATION OF TWO DIMENSIONAL BARCODED INDICIA

CROSS-REFERENCE TO RELATED APPLICATIONS

This application claims priority from U.S. Provisional Application No. 60/366,861, filed Mar. 22, 2002.

BACKGROUND OF THE INVENTION

1. Field of the Invention

The present invention relates to authenticating indicia, and, more particularly, to authenticating indicia utilizing identification information embedded in the indicia.

2. Brief Description of Related Developments

There are numerous postal carriers, for example, a governmental service such as the U.S. Postal Service or the Royal Mail of Great Britain, or commercial enterprises such as United Parcel Service, Federal Express, etc. Such a postal carrier service will be referred to herein as "the post." A high volume postal customer may use a metered system where a meter, also referred to as a Postal Security Device (PSD), is used to secure the proof of payment of postal indicia applied to mailing items that identifies the value of the postage applied. The customer may purchase postage and the purchased value may be stored in the PSD. As the postage indicia is applied to items, the value applied may be deducted from the stored value. Once postage indicia is applied, the item may then be dropped into the collection stream of the particular post and subsequently processed by the post for delivery.

As one example of postal indicia, the U.S. Postal Service Information Based Indicia Program (IBIP) specification requires postal indicia to include detailed cryptographically signed postage transaction information, printed using a two-dimensional barcode. During processing, the U.S. Postal service utilizes detection devices to verify the authenticity and value of the indicia.

It would advantageous to provide secure postage evidencing information that is verifiable automatically by postal processing equipment to guard against fraud. It would also be advantageous to provide the particular post with the ability to authenticate indicia without the need to maintain a database of customer information necessary to relate indicia to a specific customer. It would be additionally advantageous to provide secure indicia and the ability to authenticate the secure indicia for any suitable application, not limited to postal applications.

SUMMARY OF THE INVENTION

In one embodiment, the present invention is directed to an indicia authentication system that includes a franking device for embedding identification and encrypted device data into indicia and applying the indicia to an article, and a computing device for utilizing the identification data to retrieve authentication data for deciphering the encrypted device data, where the computing is adapted to utilize the deciphered device data to determine the validity of the indicia.

In another embodiment, a method of verifying the authenticity of indicia includes providing device data to a first hash function to yield a first hash value, providing the first hash value to a first digital signature function utilizing a device private key to yield a first digital signature value, and incorporating an identifier, the first hash value and the first digital signature value into the indicia. The method also includes providing the device data and a device public key to a second hash function to yield a second hash value, providing the second hash value to a second digital signature function utilizing a vendor private key to yield a second signature value, and incorporating the second hash value and a vendor public key into the indicia.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
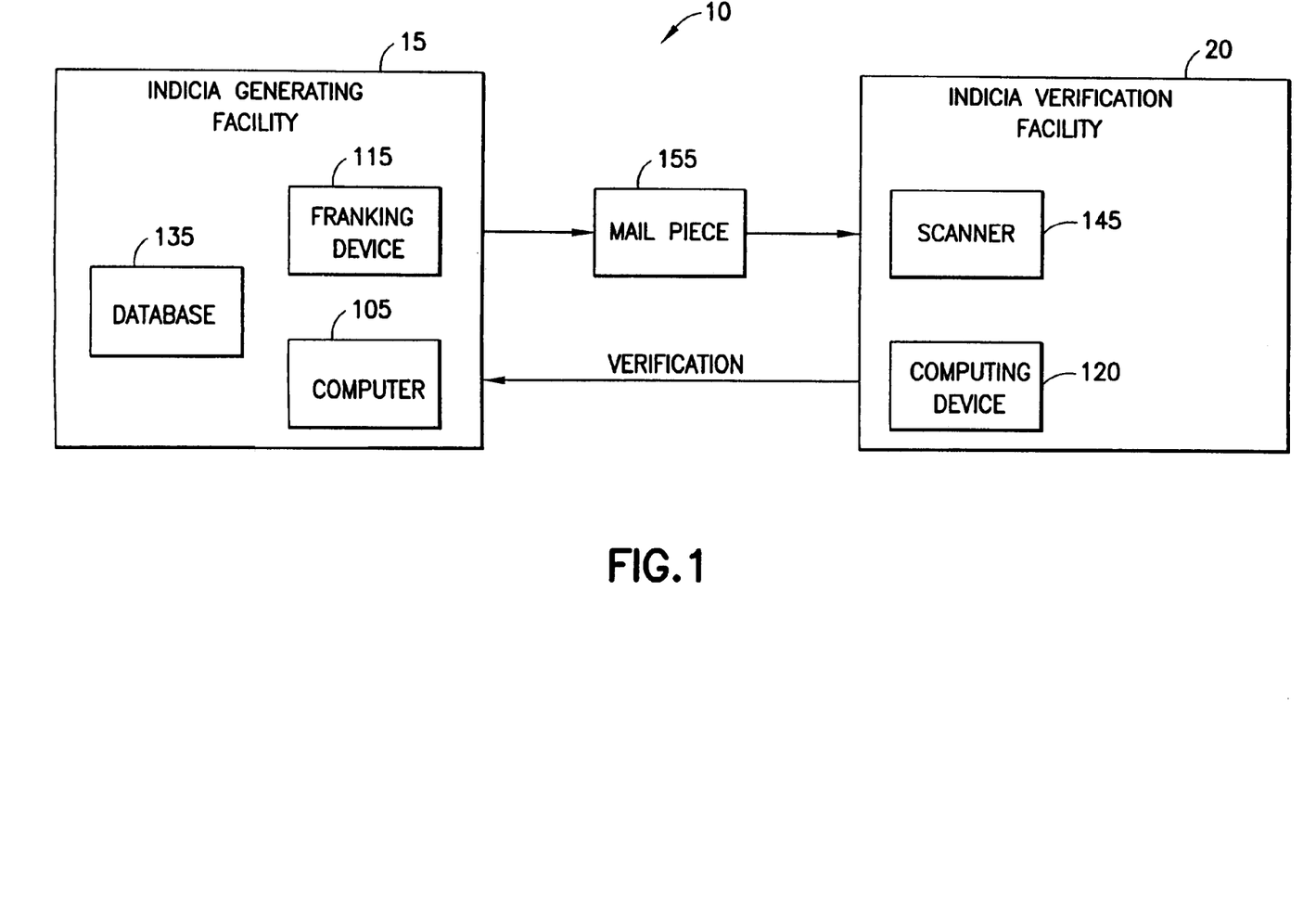
FIG. 1 illustrates a diagram of a system incorporating features of the present invention.

FIG. 1 illustrates a diagram of a system 10 incorporating features of the present invention. Although the present invention will be described with reference to the embodiments shown in the drawings, it should be understood that the present invention may be embodied in many alternate forms of embodiments. In addition, any suitable size, shape or type of elements or materials could be used.

The present invention provides a post with the ability to authenticate indicia without the need to maintain a database relating indicia to a specific customer. The embodiments relate to a database maintained by a service provider, from which information is extracted as necessary to authenticate indicia at post sites which may be remote from the database and from each other. The embodiments also relate to a methodology and system for providing authentication without requiring a post to access to a customer database.

Referring to FIG. 1, system 10 generally includes an indicia generating facility 15 and an indicia verification facility 20. The indicia generating facility is generally adapted to mark a mail piece 155 with unique identifying information and may include a computer 105, a database 135, and a franking device 115. The indicia verification facility 20 is generally adapted to receive the marked mail piece 155 to verify the unique information and generally includes a scanner, or other reading device 145, and a computing device 120.

Figure 2:
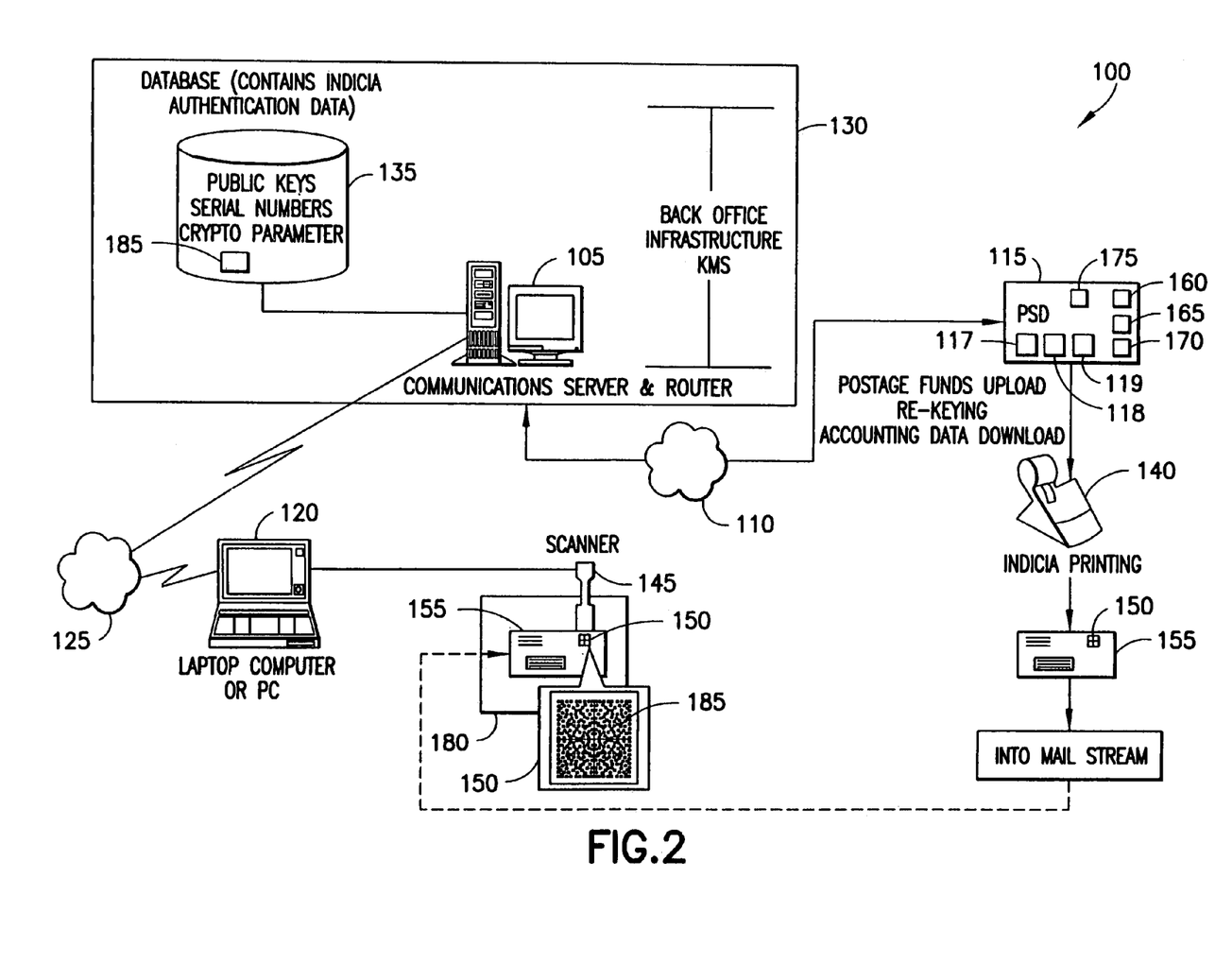
FIG. 2 shows a more detailed embodiment of such a system.

A more detailed embodiment of a system 100 incorporating features of the present invention is illustrated in FIG. 2. A computer 105 is coupled to a first data communications network 110. One or more devices suitable for providing indicia, in this example a PSD 115, are also coupled to first communications network 110, and may communicate bi-directionally through first communications network 110 with computer 105. Computer 105 may also be connected to a remote computing device 120 through a second communications network 125.

Computer 105 may be any type of processing device capable of performing the functions described herein. While a single computer 105 is shown, computer 105 may represent a plurality of computers, servers, or other suitable devices, which may be situated at a single location, or may be widely distributed and remotely sited. For example, a plurality of distributed computers 105 may be used for servicing PSDs 115 in different geographic locations, according to particular postal regulations, such as North America, South America, Europe, Africa, Japan and Southeast Asia. Alternately, a single computer 105 can be used for servicing all PSD's 115. Computer 105 could be located at an enterprise location or site 130, which could be an office of a PSD provider, or other provider of postal indicia.

Computer 105 may also include or be connected to one or more databases 135 that hold indicia authentication data 185. The one or more data bases 135 may be centralized at a specific location or may be distributed among a number of distributed computers. Indicia authentication data 185 present in database 135 may include PSD serial numbers, PSD Public Keys, Vendor Public Keys specific to a vendor of PSD's, other Public Key information, cryptographic parameters, and any other parameters that may be required for verification and authentication of indicia.

First and second communications networks 110, 125 may include any suitable communications network, for example, the Public Switched Telephone Network (PSTN), a wireless network, a wired network, a Local Area Network (LAN), a Wide Area Network (WAN), virtual private network (VPN) etc. PSD's 115 and remote computing device 120 may communicate with the computer 105 using any suitable protocol, or modulation standard, for example, X.25, ATM, TCP/IP, V34, V90, etc. In an alternate embodiment, first and second communications networks 110, 125 may be the same communication network.

One or more devices suitable for providing postal indicia, in this example a PSD 115, are also connected to first communications network 110, and may communicate bi-directionally through first communications network 110 with computer 105. PSD 115 may include a communications port 117 and a microprocessor 118 for performing electronic accounting and control functions, franking functions, and mail handling functions according to programs stored in a storage device 119.

Microprocessor 118 typically performs electronic accounting functions in relation to franking mail items with postage charges. Data associated with the accounting functions may include an accumulated total value of credit entered into PSD 115, an accumulated total value of postage charge dispensed by PSD 115 by franking mail items, a count of the number of mail items franked by PSD 115, and a count of the number of mail items franked with a postage charge in excess of a predetermined value. The accumulated total value of credit may be stored in an ascending credit register 160, the accumulated total value of postage charges dispensed may be stored in an descending tote register 165, the count of items may be stored in an items count register 170, and the count of items franked with a postage charge in excess of a predetermined value may be stored in a large items register 175. The various registers may be located in storage device 119.

The franking functions typically include marking items with indicia and reporting the number of items, value marked and other parameters to the accounting functions.

The control functions may include uploading postage funds, downloading accounting data, and secure communications with computer 105 through network 110, including implementing new public key, private key combinations. According to the present invention, the control functions may also include encrypting information into the indicia for verification and authentication. To support the control functions, storage device 119 may also include a PSD Public Key, Private Key combination specific to PSD 115, a Vendor Public Key, Private Key combination specific to the vendor of PSD 115, a PSD serial number, the present time and date, and other cryptographic parameters.

PSD 115 may also include or be integral to a device for marking objects with postal indicia, shown in this embodiment as a printer 140.

Computer 105 may also be connected to a remote computing device 120 through a second communications network 125. Remote computing device may be a dedicated controller, a work station, a desktop personal computer, a laptop or other portable computer, or any other computing device suitable for providing the functions of the present invention.

Remote computing device 120 may be operably connected to a scanner 145 capable of scanning indicia. Remote computing device 120 may optionally operate scanner 145 in conjunction with a mail handling facility 180.

The operation of the embodiment of FIG. 1 will now be described with reference to FIGS. 3 and 4.

A user utilizes PSD 115 to provide for secure imprinting of postal indicia 150 onto a mail piece. Postal indicia 150 includes all indicia required by the governing post, for example, an identifier such as a PSD serial number 185, ascending and descending registers, postage value, mailing date, rate category, etc. In accordance with the present invention, postal indicia 150 also includes information for authentication and verification which may take the form of a digital signature.

Figure 3:
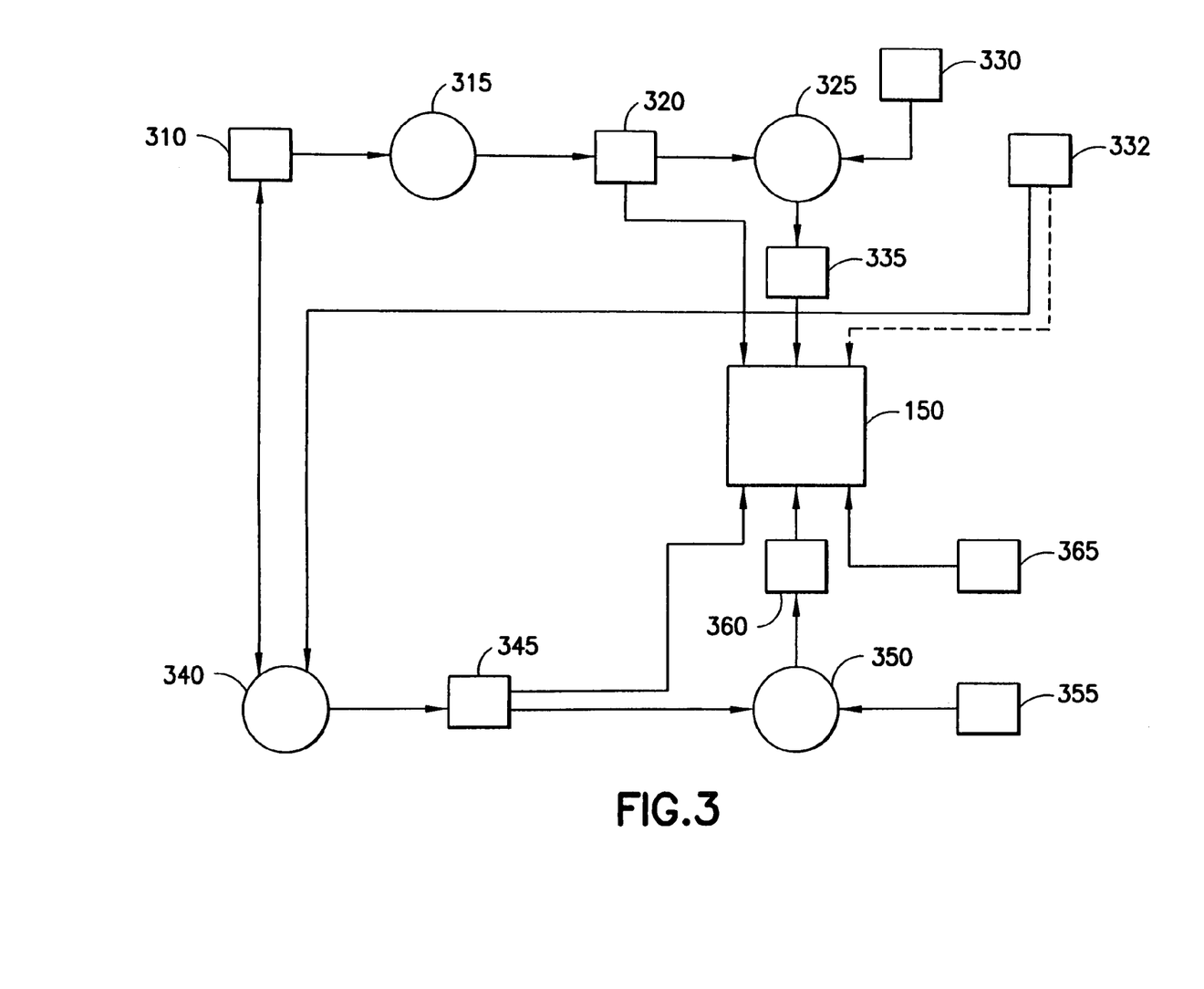
FIG. 3 shows a diagram of an indicia digital signature function and a Public Key digital signature function.
Figure 4:
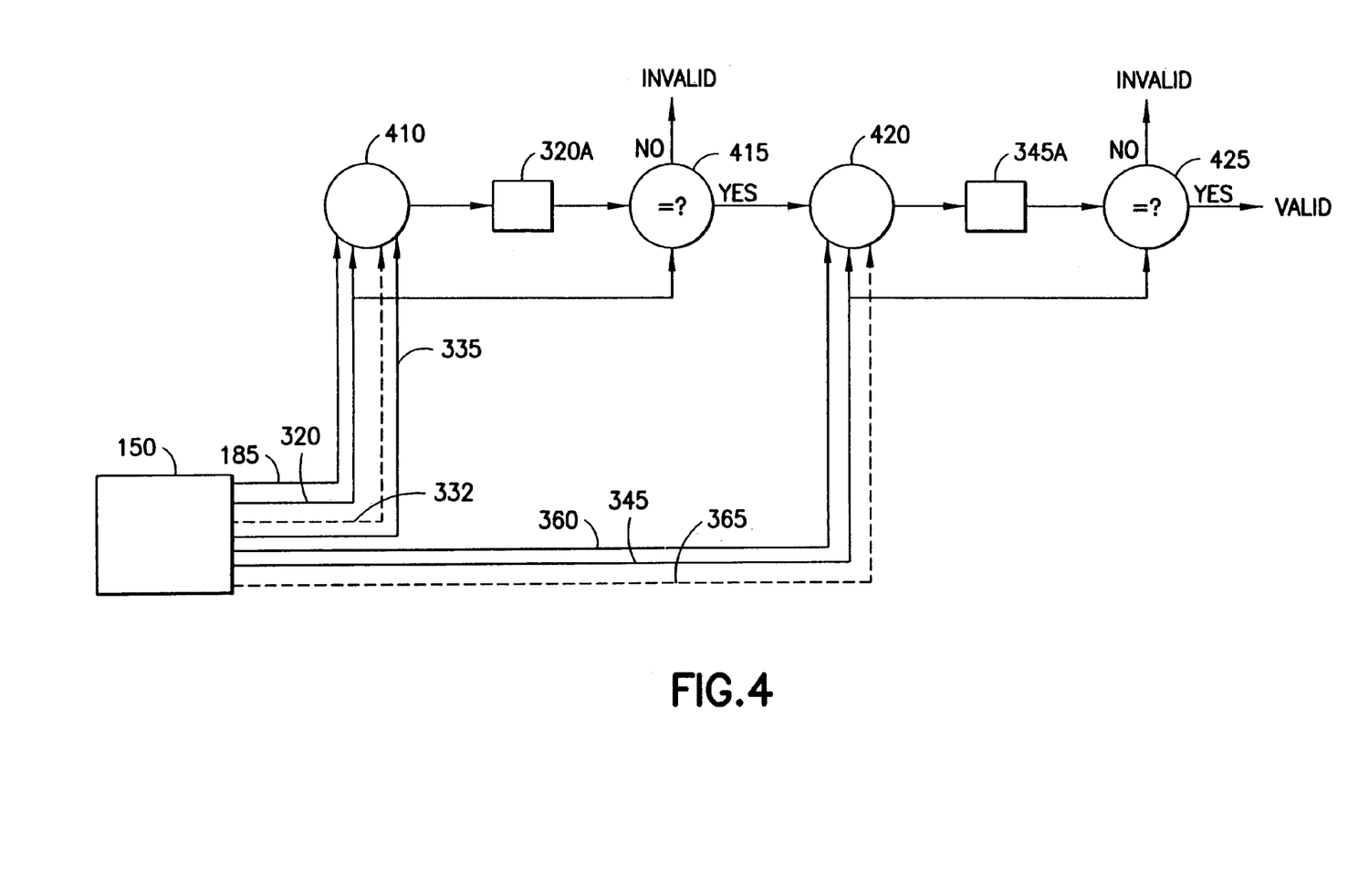
FIG. 4 shows a diagram of an indicia signature verification function and a Public Key signature verification function.

FIG. 3 shows a diagram of an exemplary digital signature technique. Device data 310, for example, the PSD serial number, postage amount, contents of the accounting registers, date, etc. is provided to a first hash function 315. The resulting first hash value 320 is then provided to a first digital signature function 325 which utilizes the PSD Private Key 330. The resulting first signature value 335, the "unsigned" first hash value 320, and optionally, the PSD Public Key 332 are incorporated into the indicia 150.

Additional information is incorporated in the indicia 150 for authenticating the PSD Public Key 332. Referring again to FIG. 3, a certificate authority may utilize predetermined components from PSD data 310 and PSD Public Key 332 which are provided to a second hash function 340. The resulting second hash value 345 is provided to a second digital signature function 350 which utilizes the Vendor Private Key 355. The resulting second signature value 360, the "unsigned" second hash value 345, and the Vendor Public Key 365 are then also incorporated into the indicia 150. In one embodiment, the first and second hash functions may be the same function and the first and second digital signature functions may be the same function.

Mail piece 155 is marked with the indicia and deposited into the mail stream. At some point in the mail stream, the indicia is authenticated. Returning to FIG. 1, as part of the authentication process, scanner 145 is used to scan indicia 150. The indicia information is conveyed to remote computing device 120 which in turn conveys the indicia information to computer 105 through network 125.

Upon receiving the indicia information, computer 105 invokes an indicia signature verification function. Referring to FIG. 4, the indicia signature verification function 410 first identifies the PSD serial number 185 (FIG. 1) and the unsigned first hash value 320 embedded in the indicia information. Computer 105 then determines the PSD Public Key 332 for the particular PSD 115, either from a stored table, database 135, or any other location accessible by computer 105. Optionally, the PSD Public Key 332 may be determined from the indicia information itself. The indicia signature verification function 410 then uses the PSD Public Key 332 to extract the first hash value 320A from the first digital signature value 335.

The extracted first hash value 320A and the "unsigned" first hash value 320 are then compared 415 and if they do not match, the indicia 150 is determined to be invalid and this determination is conveyed to the remote computing device 120.

If the extracted first hash value and the "unsigned" first hash value do match, computer 105 then invokes a key signature verification function 420 to verify the PSD Public Key 332. The key signature verification function 420 identifies the second digital signature value 360 and the unsigned second hash value 345 embedded in indicia 150. The computer 105 then determines the Vendor Public Key 365 for the particular PSD 115, either from a stored table or optionally from the indicia 150 itself. The key signature verification function 420 then uses the Vendor Public Key 365 to extract the second hash value 345A from the second digital signature value 360, and performs a comparison 425. If the extracted second hash value 345A and the "unsigned" second hash value 345 do not match, the indicia is determined to be invalid. If they do match, the indicia is determined to be valid. The determination of validity or invalidity is then conveyed to remote computing device 120.

Referring to FIG. 2, upon receiving a determination of indicia validity or invalidity, remote computing device 120 may operate to cause mail handling facility 180 to process the mail piece accordingly. For example, mail pieces may be sorted according to valid and invalid indicia, and those with valid indicia may be processed for delivery while those with invalid indicia may be held for further inspection or investigation.

Figure 5:
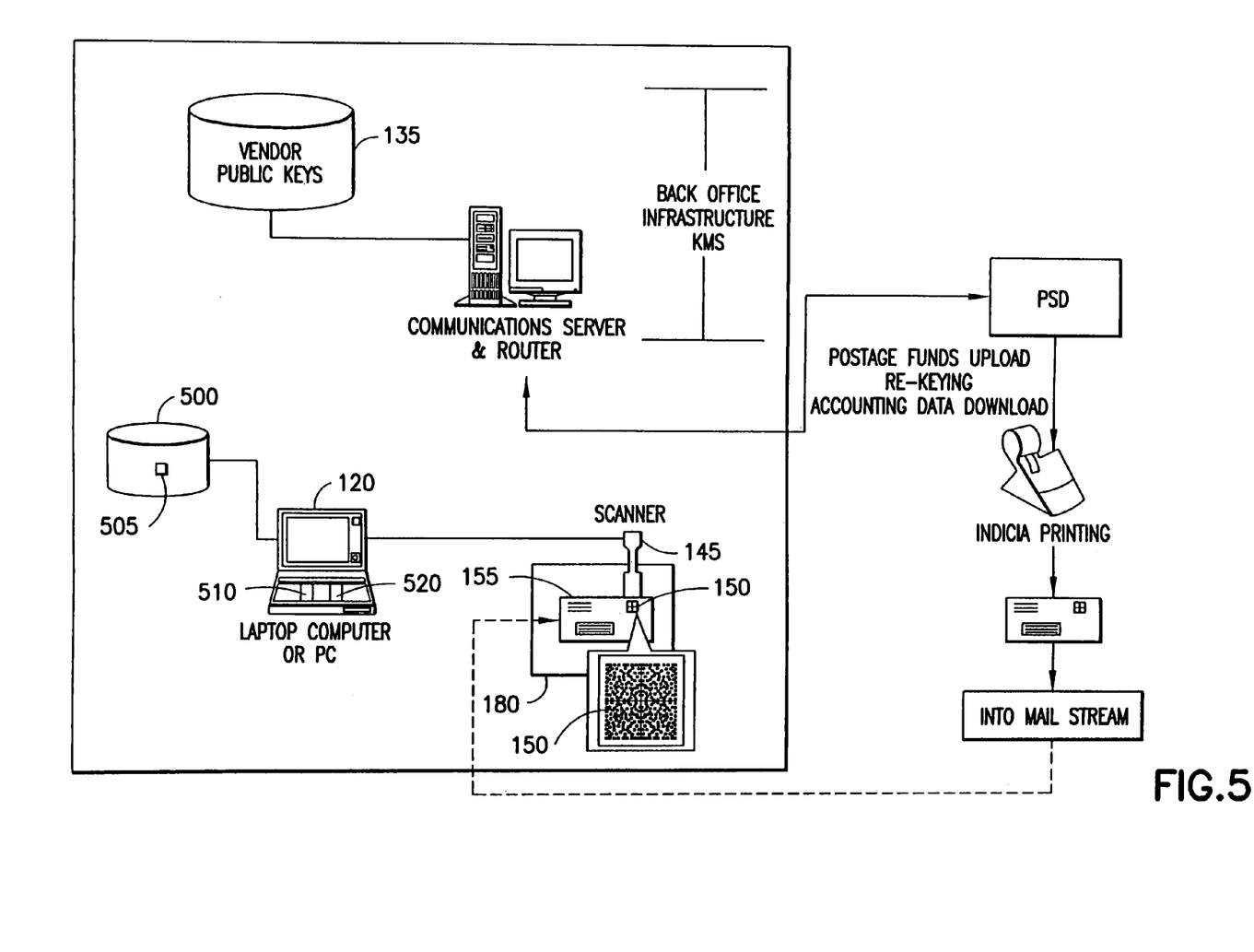
FIG. 5 shows another embodiment of a system incorporating features of the present invention.

FIG. 5 shows another embodiment of system 100 according to the present invention. In this embodiment, verification procedures are accomplished within the remote computing device 120, eliminating the need for a link to computer 105. Remote computing device 120 includes or has access to a database 500 that includes indicia authentication data 505. In this embodiment, indicia authentication data 505 may include information similar to that stored in database 135, that is, PSD serial numbers, PSD Public Keys, Vendor Public Keys specific to a vendor of PSD's, other Public Key information, cryptographic parameters, and any other parameters that may be required for verification and authentication of indicia. Indicia authentication data 505 may be periodically updated and distributed to remote computing device 120 by the post. Distribution mechanisms may include mail, email, the Internet or other network communication, paper documentation, etc.

Remote computing device 120 is operable to perform the indicia signature verification function and key signature verification function as described above and may include a storage device 510 and processing capability 520 to support such operations.

In this embodiment, PSD 115 franks mail piece 155 with indicia 150 as mentioned above, incorporating the first and second signature values, the first and second "unsigned" hash values, and optionally, the PSD and Vendor Public Keys.

Mail piece 155 is deposited into the mail stream and at some point is authenticated. Scanner 145 is used to scan indicia 150 and indicia information is conveyed to remote computing device 120. Remote computing device performs the indicia signature verification function and, if required, performs the key signature verification function as described above using indicia authentication data 510. The resulting determination of indicia validity or invalidity may then be used to further process the mail piece as described above.

An infrastructure in which the invention may be practiced may employ public key cryptography techniques that incorporate both encryption and digital signing techniques. To protect the integrity of data being communicated through the infrastructure and to authenticate its origin, communications may be digitally signed. To protect the confidentiality of the communications, they may be encrypted.

Figure 6:
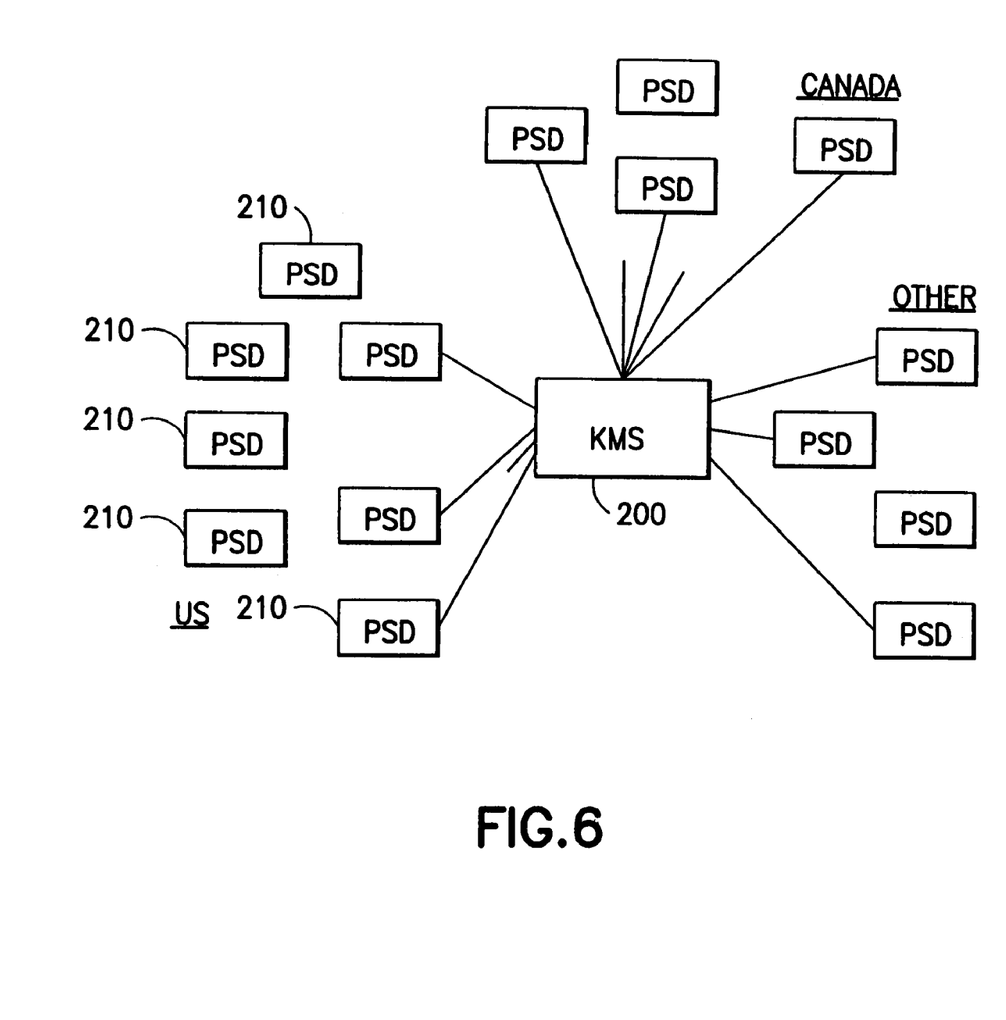
FIG. 6 shows a key management system infrastructure capable of supporting the present invention.

One type of infrastructure in which the invention may be practiced could be a key management system or a public key infrastructure that supports secure operation of devices suitable for providing postal indicia. Such a system could have a "star" configuration with a key management system server 200 in the center and postage payment entities such as PSD's 210 at the end of the spokes as shown in FIG. 6. The use of PSDs is advantageous because their electronics and software are housed within a cryptographic boundary and within a secure, tamper responsive enclosure.

While the present invention has been described in the context of postal indicia, it should be understood that the present invention may be used with any suitable type of indicia or marking scheme.

Furthermore, while the present invention has been described in the context of utilizing Public Key, Private Key based encryption, hashing techniques and digital signature techniques, it should be understood that the present invention may utilize any other suitable techniques for securing and verifying the origin of data.

Thus, the present invention provides a facility that allows authentication in one embodiment by using a database maintained by a service provider. In another embodiment, the present invention provides an authentication facility that includes all the data required for authentication locally, eliminating the need for access to the service provider database.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of verifying the authenticity of indicia comprising:
   embedding identification and encrypted device data into an indicia, wherein the embedding of the identification and encrypted device data further comprises the steps of;
   providing device data to a first hash function to yield a first hash value;
   providing the first hash value to a first digital signature function utilizing a device private key to yield a first digital signature value;
   incorporating the identification data, the first hash value and the first digital signature value into the indicia;
   providing the device data and a device public key to a second hash function to yield a second hash value;
   providing the second hash value to a second digital signature function utilizing a vendor private key to yield a second signature value; and incorporating the second hash value and a vendor public key into the indicia;

utilizing the identification data to retrieve authentication data for deciphering the encrypted device data; and determining a validity of the indicia using the deciphered device data.

2. The method of claim 1, further comprising accessing a remote database to retrieve the authentication data.

3. The method of claim 1, further comprising embedding identification and encrypted device data into indicia using a franking device.

4. The method of claim 3, wherein the identification data comprises a serial number of the franking device.

5. The method of claim 3, wherein the device data comprises one or more of a serial number of the franking device, a value applied by the franking device, and the contents of a register of the franking device.

6. The method of claim 1 further comprising:

identifying the identification data and the first hash value incorporated in the indicia;

determining a device public key from the identification data;

utilizing the device public key to extract the first hash value from the first digital signature value to yield a first extracted hash value;

comparing the first extracted hash value and the first hash value and if they do not match determining that the indicia is invalid.

7. The method of claim 6, further comprising:

comparing the first extracted hash value and the first hash value and if they match identifying a vendor public key to extract the second hash value from the second digital signature value to yield a second extracted hash value; and comparing the extracted second hash value and the second hash value and determining that the indicia is valid if they match and invalid if they do not match.

* * * * *